Oct. 29, 1957     J. HODGE ET AL     2,811,302
GAS TURBINE PLANT AND CONTROL ARRANGEMENTS THEREFOR
Filed Feb. 24, 1955     4 Sheets-Sheet 1

INVENTORS
James Hodge
Oliver Francis Hawkins Bosley
BY
ATTORNEYS

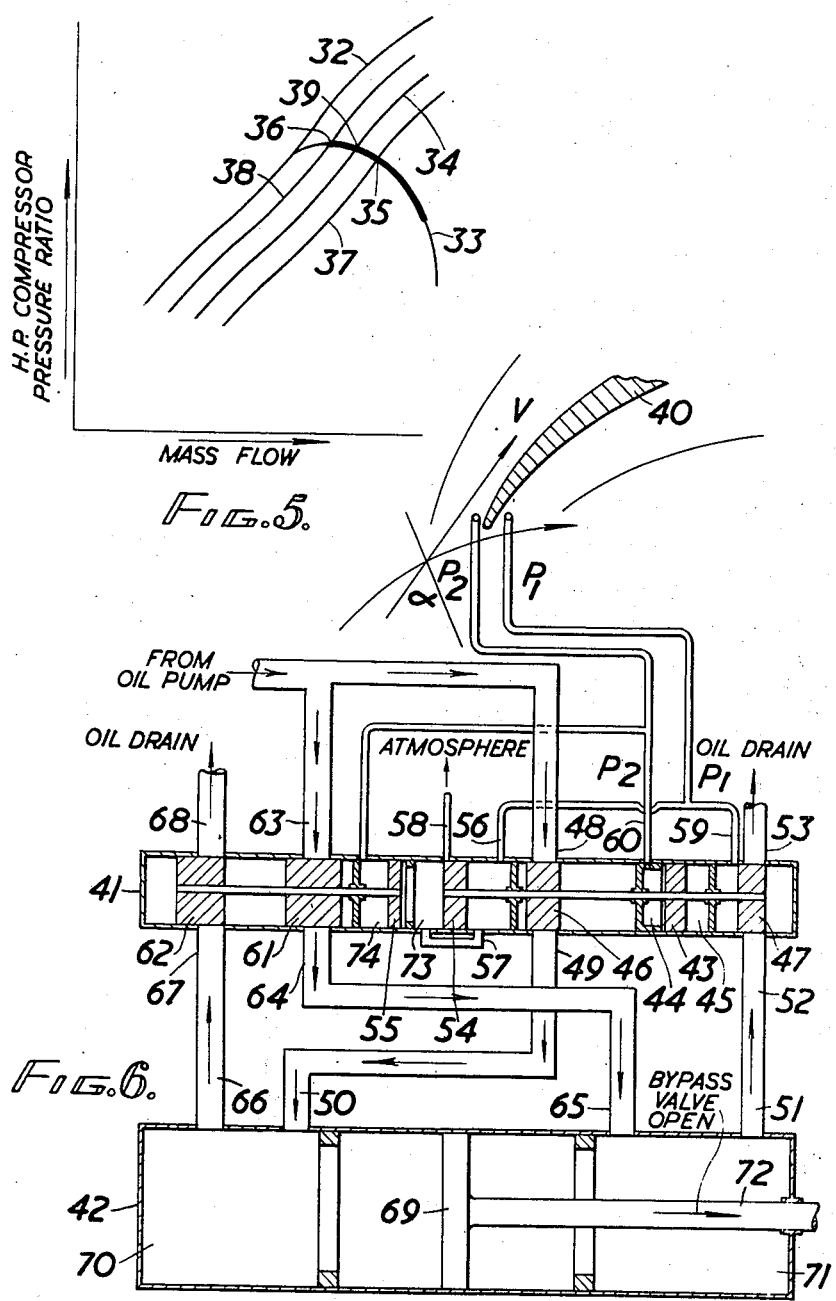

United States Patent Office 2,811,302
Patented Oct. 29, 1957

2,811,302

GAS TURBINE PLANT AND CONTROL ARRANGEMENTS THEREFOR

James Hodge and Oliver Francis Hawkins Borley, Farnborough, England, assignors to Power Jets (Research & Development) Limited, London, England, a British company Application February 24, 1955, Serial No. 490,372

Claims priority, application Great Britain February 24, 1954

18 Claims. (Cl. 230—116)

This invention relates to gas turbine-driven plant and control arrangements therefor. It is particularly concerned with the problem of providing an air output of varying mass flow from such plant at reasonably constant output pressure. This problem is encountered in the design of gas turbine-driven air compressing plant required to supply air at high pressure to a variable number of users.

It has been found in the design of such plant, that it is advantageous to employ a novel arrangement of components and cycle. In one aspect therefore, the invention provides gas turbine-driven plant operable to provide gaseous output at a pressure higher than that required for the thermodynamic cycle of the gas turbine comprising separate low and high pressure compression means for the gas, separate turbine means drivingly connected to the compression means, a heating system and ducting interconnecting the compression means, turbine means and heating system so arranged that a minor part only of the gaseous delivery of the low pressure compression means is passed through the high pressure compression means to the output, the remainder thereof being passed through the heating system and the turbine means to exhaust. Where a combustion supporting gas is being compressed, the heating system may be a combustion system in which fuel is burnt in the gas. Compound plant so arranged may have the separate turbine means connected for series or parallel flow. In the former case, a cross compounded arrangement is preferred.

A variable output may be obtained whilst there is maintenance of the flow at a predetermined minimum rate through the high pressure compression means. A simple blow-off valve for the output may be used to achieve this or preferably a by-pass is provided for an air flow from the output to rejoin that major part of the stream from the low pressure compression means which does not pass to the high pressure compression means.

In the preferred mode of operation it is proposed to maintain substantially constant a selected operating condition of the compression means, e. g. the true rotational speed of the high pressure compression means, to detect an approach towards a surge condition of the high pressure compression means and to maintain surge-free flow through the latter, e. g. by keeping above the minimum mass flow already mentioned. The detection of surge conditions may result from monitoring a local flow direction and static pressure tapping points suitably chosen can give a response dependent on the direction. A servomechanism then is able to transmit a control signal to maintain the flow.

By way of example only, reference will now be made to certian embodiments of the invention, which are shown in the accompanying drawings, in which:

Figure 5 shows typical characteristic curves for the high pressure compression means of Figure 4 and will be used to introduce discussion of the control arrangement of the plant.

Figure 6 shows the general arrangement of a control mechanism for detecting an approach towards compressor surge conditions.

Figure 1:
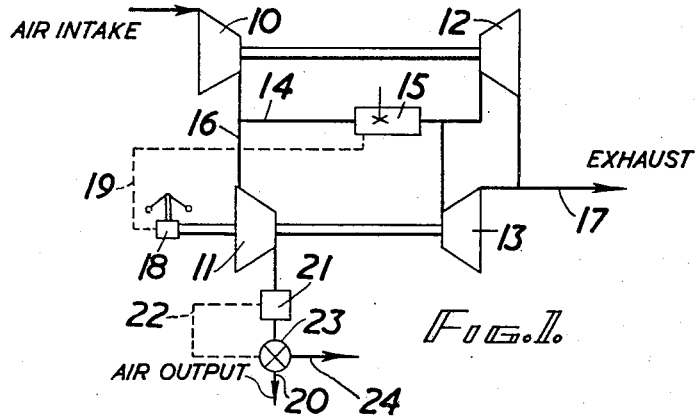
Figure 1 shows gas turbine plant of the kind specified in which parallel driving turbines are provided, governor fuel control is exercised and a blow-off valve for the high pressure output is incorporated.
Figure 2:
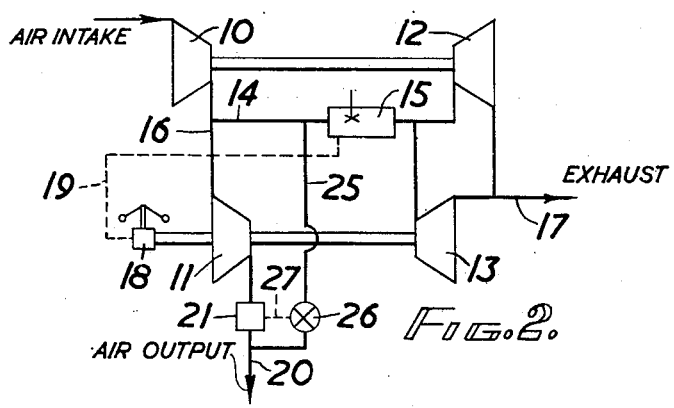
Figure 2 shows plant similar to that shown in Figure 1 except that a by-pass for the output air is provided in place of a blow-off valve.

In considering the figures in turn it should be remembered that what is desired is an air supply at an output pressure which is as nearly constant as possible irrespective of the load, that is of the required mass flow of air at the output. The overall pressure ratio of the compression means in one application is of the order of between 7 and 8 to 1. No more than 20% change in output pressure is contemplated with widely varying loads. All three figures have certain things in common. For instance they all comprise two shaft gas turbine plants in which there are both low and high pressure compressors having separate turbines to drive them. In Figures 1 and 2 those turbines are arranged in parallel following the combustion system whilst in Figure 3 the turbines are arranged in series. The low and high pressure compressors are in each case referenced as 10 and 11 respectively. The two turbines in parallel are referenced as 12 and 13 whilst those in series are referenced 12A and 13A. The cycle arrangements shown have been carefully chosen because of their ability to provide without considerable complication a substantially constant pressure air output almost irrespective of load.

Turning first to Figure 1 there will be seen a low pressure compressor 10 driven by a turbine 12 and supplying its output in two directions namely via the duct 14 to the combustion chamber 15 and via the duct 16 to the high pressure compressor 11. The proportions of the flow in the two directions are such that when the full load air output is provided from the high pressure compressor about 15 to 20% of the total flow from the low pressure compressor 10 is passed through the duct 16. The maximum proportion that can be so diverted is fixed by the work ratio of the plant. The remainder passes to the combustion system 15. The hot gases from the combustion system 15 are in turn divided, some passing through the turbine 12 and the remainder through the turbine 13, these two turbines being arranged in parallel. Both turbines exhaust into a common exhaust duct 17. The turbine 13 drives the high pressure compressor 11 and the common shaft of this compressor turbine set is governor-controlled to a constant speed, that is true R. P. M., by the governor 18. The governor 18 is arranged to control via the connection 19 the fuel supply to the combustion system 15.

As the air output from the output duct 20 decreases owing to reduced demand, the pressure of that output down to about 50% of the maximum demand can be maintained at a practically constant value by governing only. Below this load factor of 50% surging may be encountered in the high pressure compressor 11. The mechanism of constant output pressure maintenance depends on the following factors. As the load decreases the low pressure compressor rotational speed drops because of the reduced quantity of fuel being introduced into the combustion system 15 and consequent reduction in work output of the turbine 12. As the low pressure compressor rotational speed drops the delivery temperature also drops. Hence the temperature of the air supplied through the duct 16 to the high pressure compressor also drops and the pressure ratio across the high pressure compressor is therefore increased. The loss of pressure at the output from the low pressure compressor is therefore largely compensated by the pressure ratio increase across the high pressure compressor. No surging trouble is encountered in the low pressure compressor 10 because the ratio of the air output from the low pressure compressor being passed to the high pressure compressor is so small that even a reduction of 50% in the latter does not make a great deal of difference to the low pressure compressor, especially as the speed of the latter is simultaneously reduced.

For an air output demand of less than 50% of the maximum demand control means additional to the governor 18 have to be introduced. These are indicated diagrammatically in Figure 1 by a device 21 at the output from the high pressure compressor 11 which by means of a connection 22, controls a blow-off valve 23. The device shown diagrammatically at 21 is a device known per se which is responsive to flow conditions in the compressor, able to detect the appearance of unsatisfactory flow conditions such as are experienced at the onset of a surge condition and able to initiate remedial action. The device is preferably arranged as described in more detail below. Generally similar arrangements have previously been disclosed and claimed in U. S. Patent No. 2,688,844.

The device is in this instance arranged to maintain the compressor upon its required operating line during load variations by means of its control over a variable blow-off valve 23. Hence the effect of the control device 21 is to maintain the flow through the high pressure compressor 11 above the value at which surge conditions may arise by blowing off to atmosphere, via the duct 24, the excess of flow through the compressor over that required in the air output duct 20.

An alternative and preferred control system is indicated in Figure 2 where the cycle arrangement is identical with that shown in Figure 1. Again a governor 18 is employed and it controls the fuel input via the connection 19 with the combustion system 15. Again there is a flow condition detecting device 21 for the high pressure compressor 11. In this instance however, there is provided a by-pass duct 25 from the air output duct 20. This duct 25 leads to the duct 14 to join the air entering the combustion system 15. Incorporated in the duct 25 is a variable pressure reducing valve 26 which is controlled by the connection 27 from the device 21. Hence the excess mass flow over that required in the air output duct 20 is fed back via the pressure reducing valve into the combustion system inlet under control of the device 21. Compared with the system shown in Figure 1 where the excess mass flow is exhausted to atmosphere through the duct 24, we have here a system in which there is some pressure energy lost through the pressure reduction valve but heat energy from the excess mass flow is recovered and used in the cycle. This arrangement enables a considerable saving in fuel to be accomplished at low loads as compared with the blow-off to atmosphere and it also enables a slight gain to be effected in output pressure.

Figure 3:
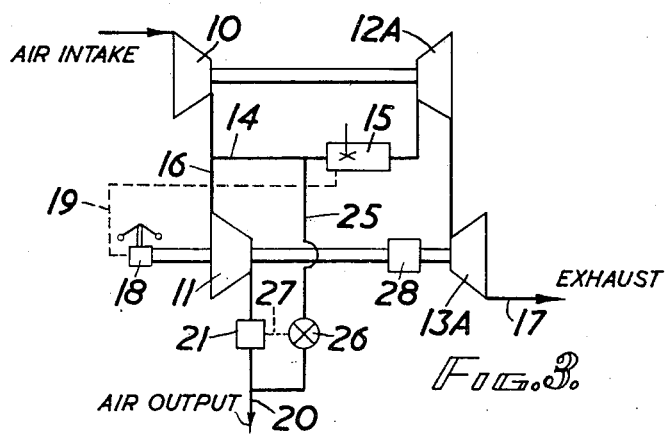
Figure 3 shows gas turbine plant of the kind specified in which the control arrangement of Figure 2 has been incorporated but series driving turbines are employed.

The control arrangement shown in Figure 2 is also applied in Figure 3 which is a series turbine cycle arrangement. The only other alternative in the plant shown in Figure 3 is the incorporation of the speed increasing gear 28 between the turbine 13A and the high pressure compressor 11 which it drives.

Figure 4:
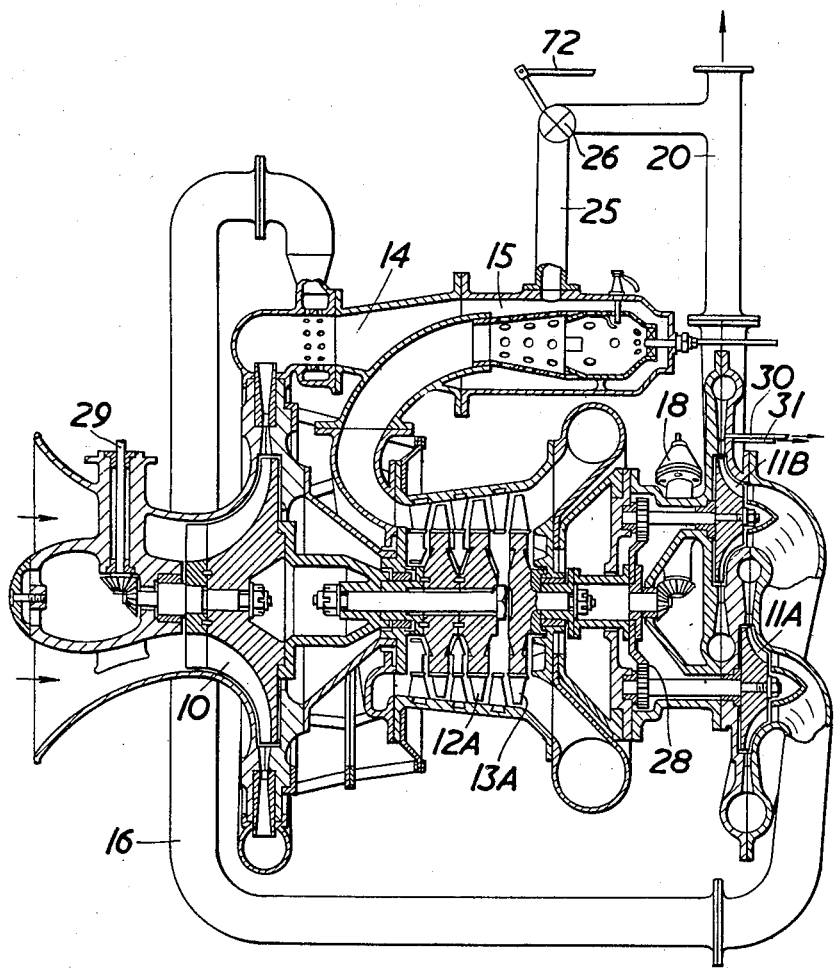
Figure 4 shows a mechanical arrangement of gas turbine-driven air compressing plant generally in accordance with Figure 3.

In Figure 4 is shown a mechanical arrangement of the gas turbine plant generally in accordance with Figure 3. The same reference numerals have been used in both figures where appropriate.

Air enters the plant via the inlet on the left of the drawing passing into the centrifugal compressor 10. The output from this compressor is divided, some air passing via the duct 14 to the combustion system 15 and the remainder via the duct 16 to the high pressure compression system. In Figure 3 the high pressure compression was effected by a single compressor 11, but in Figure 4 it will be seen that this has been replaced by two separate compressors 11A ad 11B operating in series. The high pressure air output from the plant is taken via the duct 20. The turbine arrangement in Figure 4 is the same as that shown in Figure 3, namely a cross-compounded system with the high pressure turbine driving the low pressure compressor and the low pressure turbine providing the torque for high pressure compression. Hot gases leave the combustion system 15 and enter the high pressure turbine 12A, which has a two stage rotor, and then they pass directly into the low pressure turbine 13A which is a single stage rotor. The expanded gases are collected in the scroll following the low pressure turbine and taken to exhaust.

It will be noted that the high pressure compressors are driven by the speed increasing gear 28 from the shaft of the low pressure turbine 13A. The axially aligned shaft layout shown in Figure 4 has been adopted for simplicity of layout, as compared with the parallel shaft arrangement of Figure 3. The governor 18 is driven directly from the low pressure turbine shaft, thus its operating speed is much lower than if it had been driven off the compressor shaft as shown in Figure 3. The governor itself is of conventional centrifugal type and operates upon the fuel system. The fuel and oil pumps are driven by a shaft 29 off the front of the low pressure compressor 10.

In describing the previous figures the valve 26 has been mentioned and its function has generally been outlined. In the mechanical arrangement of Figure 4 it will be seen that some of the output from the high pressure compressor 11B may be taken through a by-pass duct 25 leading via the valve 26 to the combustion system 15. Opening of the valve 26 allows a bleed of air to pass back to the combustion system. This valve is controlled by control means to be described below which are responsive to static pressure tappings taken from the high pressure compressor 11B. The bleed pipes through which the static pressure tappings are taken are shown at 30 and 31. They are taken from either side of one of the diffuser vanes of this compressor.

Figure 5 shows characteristic curves of the operation of compression means such as the high pressure compressors 11A and 11B. The pressure ratio across the two compressors has been plotted against non-dimensional mass flow. The line 32 is the well-known surge line to the left of which stable operation cannot be effected. The curve 33 is also well known to those skilled in the art as being a line of constant non-dimensional speed of operation of the compressors, reduction in mass flow at constant speed causing the operating point to move up the line 33 towards the surge line 32. It is desired that the operating point shall not approach too closely to the surge line 32 but rather that it may always move along an operating line 33 but never reach the surge condition. The actual operating line will, in fact, depart slightly from the constant non-dimensional speed line because of variation in the low pressure compressor speed and of ambient temperature. This makes no real difference to the principle of the control operation. In order to effect this it has been found necessary to design a control system which responds when the operating point reaches selected points on the line 33. The selected points are shown at 35 and 36 and these points are also respectively on characteristics 37 and 38. It has been found that these characteristics 37 and 38 each corresponds to the maintenance with varying speed and mass flow of a constant pressure ratio between the static pressures tapped off by the pipes 30 and 31. For the purpose of the control system now to be described, the constant pressure ratio between the pressure tapping points defined by the characteristics 37 will be known as the lower control characteristic and that by the curve 38 as the upper control characteristic. The points 35 and 36 on these curves will respectively be known as the lower and upper control points. The point at which an intermediate characteristic 34 and the curve 33 intersect will be referred to below as the design point 39. In the practical form of the control system it has been found to be acceptable to allow operation along a constant true rotational speed characteristic rather along a non-dimensional speed curve 33. The principle remains the same but this slight modification allows the use of a simple mechanical governor to control this one operating condition. On Figure 5 the variation that this modification effects makes little difference and to avoid unnecessary complexity it has been ignored.

In Figure 6 is shown a simplified diagram of a suitable control mechanism to restrict the operation of the high pressure compressors to between the upper and lower control points.

The static pressure tappings 30 and 31 are taken from opposite sides of a diffuser vane 40. The direction of air flow at the radial position of these tappings is shown by an arrow V. The flow at this point departs from radial by an angle $\alpha$. As surge condition is approached, the angle $\alpha$ increases and the ratio of the static pressures, $P_2/P_1$, is also increased. Similarly, $P_2/P_1$ is reduced as the operating condition departs from surge. The mechanism responds to changes in $P_2/P_1$ when the ratio has reached the predetermined upper or lower value previously mentioned with regard to Figure 5.

The control comprises a hydraulic double servo-mechanism operating the by-pass valve 26. This valve may be of a known sleeve type, and it will cause a substantial pressure reduction in the by-passed flow. The double servo-mechanism is enclosed in cylinders 41 and 42. A piston 43, to be known as "the anti-surge piston," is movable under the influence of air pressures $P_2$ and $P_1$, which are effective in partitioned pressure chambers 44 and 45 respectively, through the pipes 59 and 60. This anti-surge piston operates valves 46 and 47 which control the entry and exit of oil to pressure chambers 70 and 71 on opposite sides of a piston 69 in a cylinder 42 by way of ports 48, 49, 50, 51, 52 and 53. This oil is supplied under pressure from the lubricating oil pump of the gas turbine plant. The anti-surge valve 47 also operates valve 54, which controls the application of air pressure $P_1$ to a piston 55 in chamber 56 via pipes 56, 57 and 58.

Piston 55 operates valves 61 and 62 to control the entry and exit of oil to cylinder 42, in an opposite sense to that of 46 and 47, by way of ports 63, 64, 65, 66, 67 and 68. It may be seen that the valves 47 and 62 controlling the exit of oil from the cylinder 42 are given a "lead" over their co-operating oil entry valves 46 and 61 respectively. This is to ensure movement of the piston 69 as soon as the entry valves are open. The piston 69 carries a control rod 72 which operates the by-pass valve 26.

When the plant is running steadily at 50% load or less, the control is as depicted in Figure 6. All oil ports are closed, and piston 69 is stationary under equal pressures of oil in chambers 70 and 71.

As surge is approached, due to a reduction in the compressed air output taken from the plant, the angle $\alpha$ is increased. The pressure $P_2$ then rises in proportion to $P_1$. When the ratio $P_2/P_1$ is at the upper control value, the anti-surge piston 43 moves to the right because of its construction which will be described in more detail below. It opens valves 46 and 47, thus admitting oil to chamber 70 and allowing it to escape from chamber 71. Hence piston 69 moves to the right, opening the by-pass valve, and compressor surge is averted.

Piston 43 also moves valve 54 to the right, closing the passage 57 and opening the port 58. The pressure in the chamber 73 is then reduced to atmospheric. Hence piston 55 will only be subjected to the pressure $P_2$ in the partitioned chamber 74, and valves 61 and 62 remain closed. This is to ensure that when $P_2/P_1$ begins to fall as the compressor operating point falls away from the surge line, there will be no tendency for piston 55 to move to the left, and open valves 61 and 62.

As soon as the ratio falls to the lower control value, piston 43 moves to the left, valves 46 and 47 are closed and the movement of piston 69 is arrested. Piston 54 closes the atmospheric port 58 and opens the passage 57, admitting air under pressure $P_1$ into the chamber 73.

Piston 55 moves to the left, opening valves 62 and 63, thus admitting oil to chamber 71 and allowing it to escape from chamber 70. Piston 69 will move to the left, closing the by-pass valve 26 by means of the rod 72, and the compressor operating point will move towards surge. When the ratio $P_2/P_1$ has increased again to a chosen design value, between upper and lower values, the piston 55 will move to the right, closing valves 61 and 62, and piston 69 will come to a standstill. Hence it will be seen that, for loads below 50%, the compressor operating range will be confined to between the upper and lower values of $P_2/P_1$, and the development of serious surge conditions is avoided by adjustment of the by-pass valve.

When the load is above 50%, the compressor will always be operating below the lower control value of $P_2/P_1$. The piston 55 will be moved to the left, valves 61 and 62 open, piston 69 moved to the left, and the by-pass valve shut. In other words, when a high compressed air output is required, there is no likelihood of surge and the air by-pass is not required.

Figure 7:
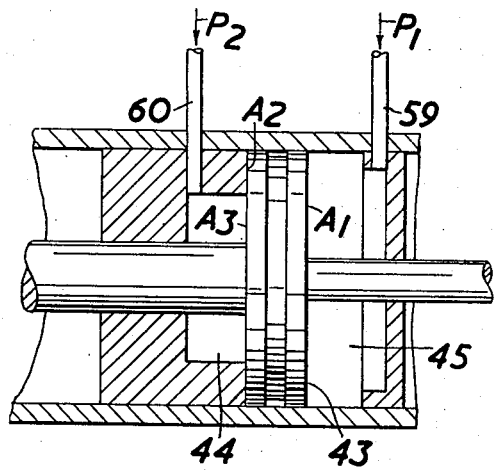
Figures 7 and 8 illustrate details of the control mechanism.
Figure 8:
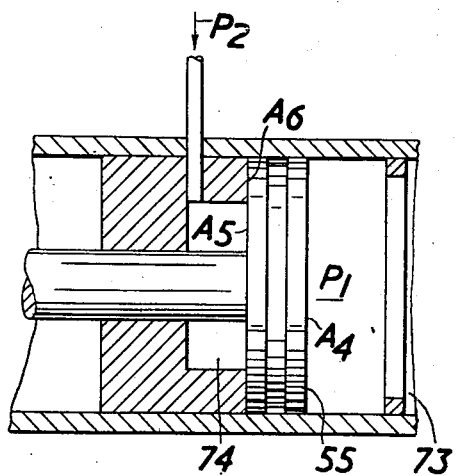

Figures 7 and 8 show in more detail the piston arrangements of the servo-mechanism. In Figure 6, a simple piston and cylinder arrangement has been shown to avoid complication. But it is desirable that the movements of the pistons should occur rapidly at pre-determined ratios, and this requires modification of the simple diagrammatic arrangement of Figure 6.

Figure 7 shows diagrammatically a suitable arrangement of the anti-surge piston shown at 43 in Figure 6. Areas $A_3$ and $A_1$, acted upon by the pressures $P_2$ and $P_1$ on opposite sides of the piston, are different when the piston is in the position shown. The annular area $A_2$ is prevented in known manner from being subject to the pressure $P_2$, and the piston rod is of a suitably different diameter on each side of the piston.

When the plant is running steadily, the piston is as shown. When $P_2/P_1$ reaches the upper control value, the force $P_1 \times A_1$, which is holding the piston to the left, is overcome by the force $P_2 \times A_3$. The piston begins to move to the right, and instantly the annular area $A_2$ becomes subject to the pressure $P_2$. The piston then moves rapidly to the right under the force due to $P_2 \times (A_2 + A_3)$, until it is checked by a stop.

The piston will remain held to the right until the lower control value of $P_2/P_1$ is reached. At this point, the force $P_2 \times (A_2 + A_3)$ is overcome by that due to $P_1 \times A_1$, and the piston will then return to the left.

Figure 8 shows an arrangement of the piston 55 of Figure 6 where it is in the right hand position. In Figure 8 the piston is shown at the left, and the valves 61 and 62 of Figure 6 would be open. The by-pass valve 26 (Figure 4) is closed by the piston 69, and the ratio $P_2/P_1$ will be increased at the approach of surge conditions. At the chosen design value of the ratio, in between upper and lower control values, the force $P_2 \times A_5$ overcomes the force $P_1 \times A_4$, and the piston starts to move to the right. The movement is accelerated by the additional force $P_2 \times (A_5 + A_6)$ which is immediately brought to bear on the piston. The piston is held to the right, so preventing further movement of the piston 69 and thus keeping a steady operating condition, until $P_2/P_1$ again drops to the lower control value, when it will move back to the left.

In order that the piston 55 may move to the right at the chosen ratio between upper and lower values, the area $A_5$ will be greater in proportion to $A_4$ than is $A_3$ to $A_1$ in Figure 7. Similarly pistons 55 and 43 have to move simultaneously to the left at the lower control point, hence the ratios $$\frac{A_4}{A_6}=\frac{A_1}{A_2}$$

What we claim is:

1. Gas turbine driven plant operable to provide a gaseous output at a pressure higher than that required for the thermo dynamic gas turbine cycle comprising, low pressure gas compression means, first turbine means drivingly connected to said low pressure compression means, high pressure compression means, second turbine means drivingly connected to said high compression means, a gas heating system, ducting arranged to convey the delivery of said low pressure compression means partly to said high pressure compression means and partly to said heating system, flow division means incorporated in said ducting and arranged to pass a major part of said delivery to said heating system and a minor part of said delivery to said high pressure compression means, a gas flow path from said heating system through said first and second turbine means, and an output duct through which compressed gas is delivered from said high pressure compression means.

2. Gas turbine driven plant operable to provide a gaseous output at a pressure higher than that required for the thermo dynamic gas turbine cycle comprising, low pressure gas compression means, first turbine means drivingly connected to said low pressure compression means, second turbine means drivingly connected to said high pressure compression means, a combustion chamber, fuel supply means to said combustion chamber, ducting arranged to convey the delivery of said low pressure compression means partly to said high pressure compression means and partly to said combustion chamber, flow division means incorporated in said ducting and arranged to pass a major part of said delivery to said combustion chamber and a minor part of said delivery to said high pressure compression means, a gas flow path from said combustion chamber through said first and second turbine means and an output duct through which compressed gas is delivered from said high pressure compression means.

3. Gas turbine-driven plant as claimed in claim 2 wherein said gas flow path is arranged with said first and second turbine means connected in parallel from said combustion chamber.

4. Gas turbine-driven plant as claimed in claim 2 wherein said gas flow path is arranged with said first and second turbine means connected in series from said combustion chamber.

5. Gas turbine-driven plant as claimed in claim 4 wherein said low and high pressure compression means and said first and second turbine means are cross compounded.

6. Gas turbine-driven plant as claimed in claim 2 further comprising means for maintaining substantially constant a selected operating condition of said high pressure compression means, means for detecting in operation an approach towards a surge condition of said high pressure compression means and means responsive to said detecting means for maintaining surge free flow through said high pressure compression means.

7. Gas turbine-driven plant as claimed in claim 6 wherein said flow maintenance means comprises valve means controlling the air output mass flow and operable in the sense of reducing the delivery through said output duct to a level below that of the mass flow through said high pressure compression means.

8. Gas turbine-driven plant as claimed in claim 7 in which said valve means provides a blow-off to atmosphere from said output duct.

9. Gas turbine-driven plant as claimed in claim 7 in which said valve means is situated in a duct interconnecting the downstream side of said high pressure compression means and said combustion chamber and is operable in the sense to by-pass air away from said output duct to said combustion chamber.

10. Gas turbine-driven plant as claimed in claim 6 wherein said detecting means comprises a device for responding to a local flow direction in said high pressure compression means.

11. Gas turbine driven plant as claimed in claim 10 in which said device comprises two static pressure tapping points subjected to the flow through said high pressure compression means and a servo-mechanism responsive to the ratio of pressures derived from said tapping points.

12. Gas turbine-driven plant as claimed in claim 11 in which said servo-mechanism is arranged to react sharply to two predetermined limiting pressure ratios and to recognize a pressure ratio intermediate between said limiting ratios.

13. Gas turbine-driven plant as claimed in claim 12 and in which a control interconnection between said servo-mechanism and said flow maintenance means is arranged to keep said pressure ratio between the limiting values and to control the flow with a bias towards the maintenance of said intermediate pressure ratio.

14. Gas turbine-driven plant as claimed in claim 6 wherein said means for maintaining substantially constant a selected operating condition of said compression means controls the true rotational speed of the high pressure compression means.

15. Gas turbine-driven plant as claimed in claim 14 wherein said operating condition maintenance means comprises a governor drivingly connected to said high pressure compression means and operative upon the fuel supply to the combustion system.

16. Gas turbine-driven plant operable to provide an air output at a pressure higher than that required for the thermodynamic cycle of the gas turbine comprising an air intake, separately rotatable low and high pressure compression means connected in series, an output duct connected to the delivery side of said high pressure compression means, a combustion chamber arranged to receive its air supply from said low pressure compression means, first and second turbine means adapted to expand combustion gases and air from said combustion chamber to exhaust, drive means interconnecting said first turbine means and said low pressure compression means and second turbine means to said high compression means, a by-pass duct between said output duct and said combustion chamber, detecting means responsive to an operating condition of said high pressure compression means, a valve in said by-pass duct and a mechanism controlled by said detecting means and in turn controlling the opening and shutting of said valve.

17. Gas turbine-driven plant as claimed in claim 16 wherein said first and second turbine means consists respectively of first and second independently rotatable turbines connected for series flow, the first turbine receiving combustion gases and air directly from the combustion chamber and the second turbine receiving combustion gases and air from the first turbine.

18. Gas turbine-driven plant as claimed in claim 17 wherein said high pressure compression means comprises two series-connected compressors.

References Cited in the file of this patent

UNITED STATES PATENTS

| 2,280,765 | Anxionnaz et al. | Apr. 21, 1942 |
| 2,375,006 | Larrecq | May 1, 1945 |

FOREIGN PATENTS

| 531,997 | Great Britain | Jan. 15, 1941 |